US012663098B2

(12) United States Patent　　　　(10) Patent No.:　US 12,663,098 B2
Dimitroff　　　　　　　　　　　　　(45) Date of Patent:　Jun. 23, 2026

(54) NON-DISRUPTIVE UNDERGROUND PIPE REPLACEMENT PROCESS

(71) Applicant: Ted R. Dimitroff, Columbia, MO (US)

(72) Inventor: Ted R. Dimitroff, Columbia, MO (US)

( * ) Notice: Subject to any disclaimer, the term of this patent is extended or adjusted under 35 U.S.C. 154(b) by 0 days.

(21) Appl. No.: 18/583,519

(22) Filed: Feb. 21, 2024

(65) Prior Publication Data

US 2024/0418295 A1　　　Dec. 19, 2024

Related U.S. Application Data

(60) Provisional application No. 63/508,970, filed on Jun. 19, 2023.

(51) Int. Cl.
F16L 1/028　　　(2006.01)
E03B 7/02　　　(2006.01)

(52) U.S. Cl.
CPC ............... F16L 1/028 (2013.01); E03B 7/02 (2013.01)

(58) Field of Classification Search
CPC ... F16L 1/028; F16L 1/032; E03B 7/02; E03F 3/06
USPC .................................. 405/184, 184.1, 184.3
See application file for complete search history.

(56) References Cited

U.S. PATENT DOCUMENTS

| | | | | |
|---|---|---|---|---|
| 4,422,800 | A * | 12/1983 | Parish | E21B 7/20 |
| | | | | 405/184 |
| 5,580,188 | A * | 12/1996 | Nowak | E21B 7/28 |
| | | | | 405/184 |
| 6,732,816 | B2 | 5/2004 | Dimitroff | |
| 7,581,600 | B1 * | 9/2009 | Dimitroff | E21B 7/046 |
| | | | | 405/184 |
| 8,277,147 | B2 * | 10/2012 | Cilliers | F16L 1/032 |
| | | | | 405/184.2 |
| 8,641,326 | B2 * | 2/2014 | Dimitroff | F16L 55/1658 |
| | | | | 405/184.3 |
| 10,408,375 | B2 * | 9/2019 | Trout | F16L 1/06 |
| 2020/0099202 | A1 * | 3/2020 | Hastings | H02G 1/088 |
| 2022/0356672 | A1 * | 11/2022 | Rosén | F16L 59/04 |

* cited by examiner

*Primary Examiner* — Sean D Andrish
(74) *Attorney, Agent, or Firm* — McKee, Voorhees & Sease, PLC

(57)　　　　　ABSTRACT

A method of installing a new underground pipe adjacent an existing underground pipe begins with drilling a series of substantially vertical boreholes downwardly from the ground surface so as to expose a portion of the existing pipe. Then, a pilot stem is directionally bored in a first direction adjacent the existing pipe and intersecting the bottoms of the vertical boreholes. Next, a reamer head is pulled in an opposite direction to enlarge the pilot hole, while pulling the new pipe through the enlarged hole behind the reamer head. The new pipe extends substantially parallel and adjacent the existing pipe. When the existing pipe is a water main, water service through the existing pipe is maintained during these drilling steps, until the new pipe is installed and connected for water service. The existing pipe is retained and can be repurposed for other uses.

18 Claims, 4 Drawing Sheets

NON-DISRUPTIVE UNDERGROUND PIPE REPLACEMENT PROCESS

CROSS REFERENCE TO RELATED APPLICATIONS

This application claims priority under 35 U.S.C. § 119 to provisional patent application U.S. Ser. No. 63/508,970 filed Jun. 19, 2023. The provisional patent application is herein incorporated by reference in its entirety, including without limitation, the specification, claims, and abstract, as well as any figures, tables, appendices, or drawings thereof.

BACKGROUND

Water is typically provided to residential and commercial buildings through a large diameter main pipe (i.e. "water main") which runs along or below a street, with smaller diameter water service lines running to each individual building. Periodically, the water main or mainline must be replaced for various reasons, such as failure due to age or other damage. Various methods have been utilized to replace these pipes, such as trenchless technology, without the need for open trenches. Trenchless replacement methods include pipe bursting, relining, and horizontal directional drilling. Pipe bursting and relining require that the water service to each home or business be shut off before the pipe is burst or relined. Such water shut off creates a big inconvenience for the customers while the work is done, which may take several days. Furthermore, pipe bursting creates pressure in the soil, which results in surface deformation, such as bumps and/or holes in the streets, and may damage other, nearby underground utilities.

Horizontal directional drilling often has problems with maintaining accuracy and maintaining the proper grade. Directional drilling also is done at a distance spaced away from the pipe to avoid hitting and damaging the old pipe, which requires additional surface or area above ground to do the work. Horizontal directional drilling also creates underground fluid pressure, leading to humps in roadways and driveways, and damage to existing utilities.

Therefore, there is a need for an improved process for installing new water mains without disrupting the existing water main.

Accordingly, a primary objective of the present invention is the provision of a non-disruptive underground pipe replacement process.

Another objective of the present invention is the provision of a process for replacing an existing or old water main or other underground pipe with a new pipe in close proximity to the old water main.

A further objective of the present invention the provision of a water main or pipe replacement process which minimizes worktime, the water shut off time, and any inconvenience to water customers.

These and other objectives become apparent from the following description of the invention.

SUMMARY

A method of replacing an underground pipe, such as a water main, without disruption of the main service, includes a first step of drilling a series of substantially vertical boreholes downwardly from the ground surface to a distance adjacent to the old or existing main, such that an edge of the main is exposed. Then, a pilot hole is directionally bored adjacent the main so as to intersect the series of downward bores. The pilot hole is then back reamed to a larger diameter to accommodate the new pipe, which is pulled behind the reamer head. The old or existing main remains functional until the new pipe is installed. The new pipe is adjacent, and substantially parallel to the old/existing pipe. After the water/liquid/fluid supply to the old pipe is shut off, the old pipe is retained in the ground, and can be re-purposed for other uses.

DETAILED DESCRIPTION

An existing underground pipe 10, such as a water main, is buried beneath the surface 12 of the ground. The first step in replacing the existing or old main 10 involves drilling a series of spaced apart, substantially vertical, sight relief holes 14 downwardly from the surface 12, so as to expose an outer edge of the old main and adjacent the bottom of the holes 14. Liquid may be provided during this drilling process to lubricate the drill, so as to form a slurry with the soil in the sight relief holes 14.

Figures 3, 4:
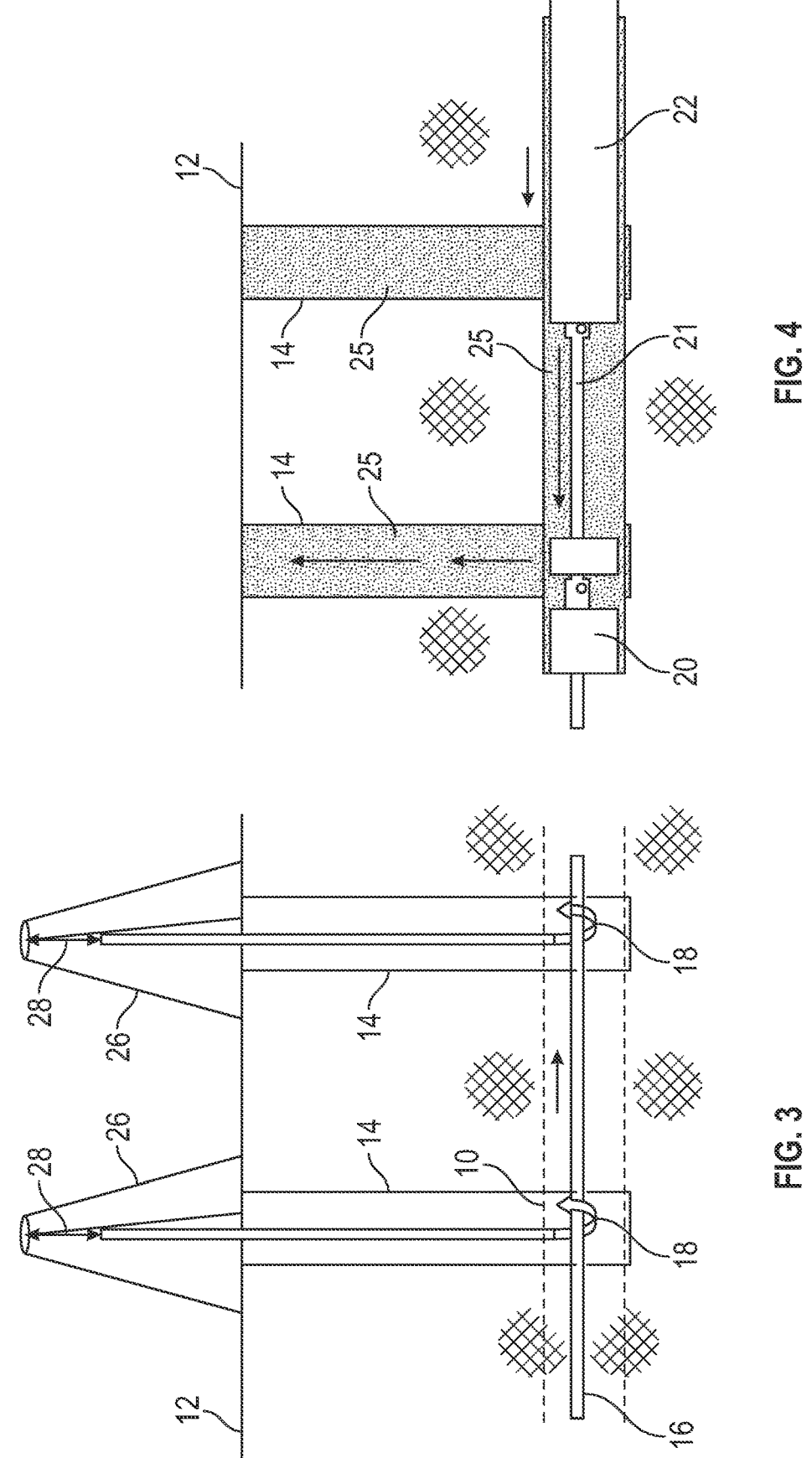
FIG. 3 is a schematic view illustrating the pilot hole drilling step according to the present invention.
FIG. 4 is a schematic view showing the reaming step and new pipe installation step, according to the present invention.

The second step in the pipe or main replacement process is to drill a pilot hole using a horizontal directional drilling pilot stem 16, with the pilot hole being spaced relatively close to the existing main 10 and extending substantially parallel with the old main 10. The pilot stem 16 passes through the sight relief holes 14 to assure accurate drilling of the pilot hole. Support hooks 18 extend downwardly through each relief hole 14 to support the stem 16 during the drilling step. See FIG. 3. The soil slurry 25 functions as a dampening agent to prevent the pilot stem 16 from whipping or jumping out of the support hooks 18. The slurry also lubricates the support hooks 18 to minimize friction and to prevent overheating and abnormal wear on the hooks by the pilot stem 16.

Next, a back reaming tool 20 attached to the stem 16 is pulled in the opposite direction to back ream the pilot hole to an enlarged diameter minimally larger than the outside diameter of the new pipe or main pipe 22. The new pipe 22 is connected to the reaming tool 20 by a connecting rod 21, such that the reaming tool 20 and new pipe 22 are pulled through the enlarged hole in a single step, as the reaming tool enlarges the pilot hole ahead of the path new pipe 22. See FIG. 4.

The enlarged hole extends along the existing, old water main 10, through the sight relief holes 14. The reaming tool 20 does not contact the existing main 10. The new main 22 is pulled into place behind the reaming tool 20 as the enlarged hole 24 is formed. Additional liquid or fluid can be used during the reaming step to produce additional slurry. The slurry is expelled, in part, upwardly out of the sight relief holes 14 during the reaming step. After the new pipe 22 is in place, additional slurry can be vacuumed out of the relief holes 14, which can then be filled with soil or other desired material.

The support hooks 18 are removed during the back reaming process, just before the reaming tool 20 reaches each support hooks 18.

As the pilot stem 16 reaches each sight relief hole 14, the depth and line of the bore stem 16 can be measured, so as to maintain the proper grade along the existing main 10. The hooks 18 are supported above the ground in any convenient manner, such as by tripods 26. A lifting mechanism 28 is provided for each hook 18, to allow the vertical position of the hook 18 to be adjusted, as needed, to maintain the proper line and grade of the pilot stem 16.

The pilot hole drilling and enlarged hole reaming steps are generally described in the inventor's prior U.S. Pat. Nos. 6,732,816, 7,581,600, and 8,641,326, which are incorporated herein by reference. The pilot drilling and reaming steps are performed without shutting off fluid flow through the existing main 10, so as to maintain water (or other liquid or fluid) service to each building through the existing service lines 30 extending from the existing main 10. After the new main 22 is installed, service is temporarily shut off to allow the service lines 30 to be connected to the new main 22. Then, service is restored after minimal downtime.

Figure 1:
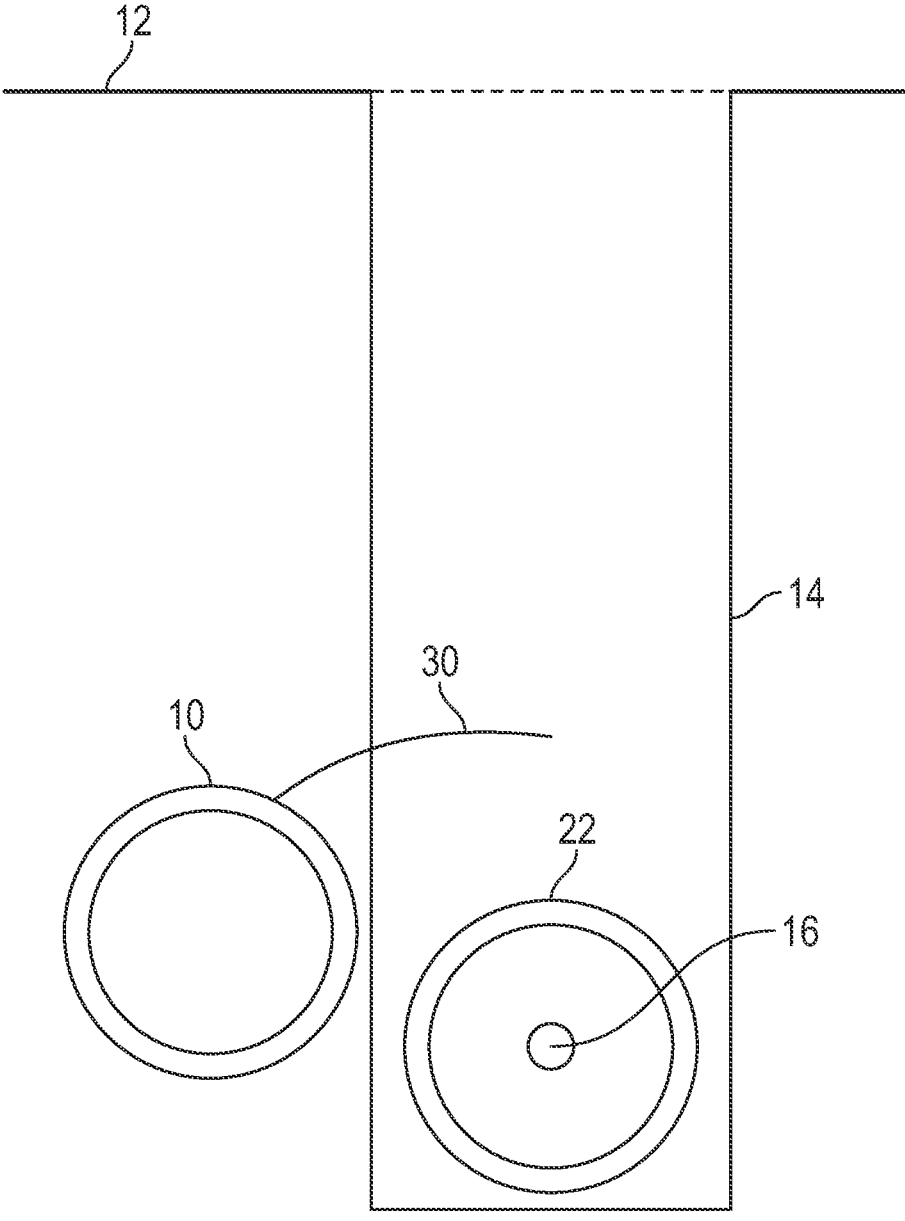
FIG. 1 is a schematic view showing placement of a new underground pipe or water main adjacent an old pipe or water main using the process of the present invention.
Figure 2:
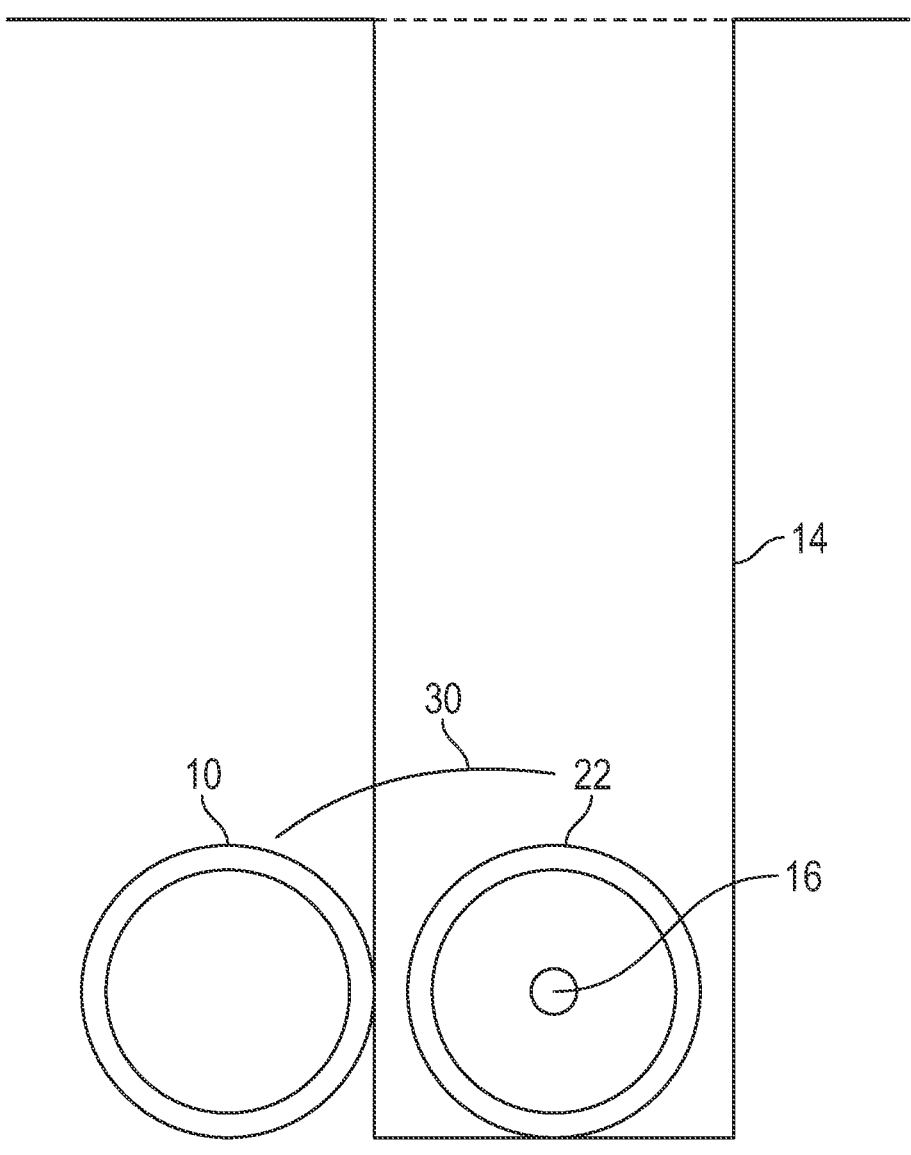
FIG. 2 is a sketch showing an alternative position of the new pipe or water main relative to the old water main, using the method of the present invention.
Figure 5:
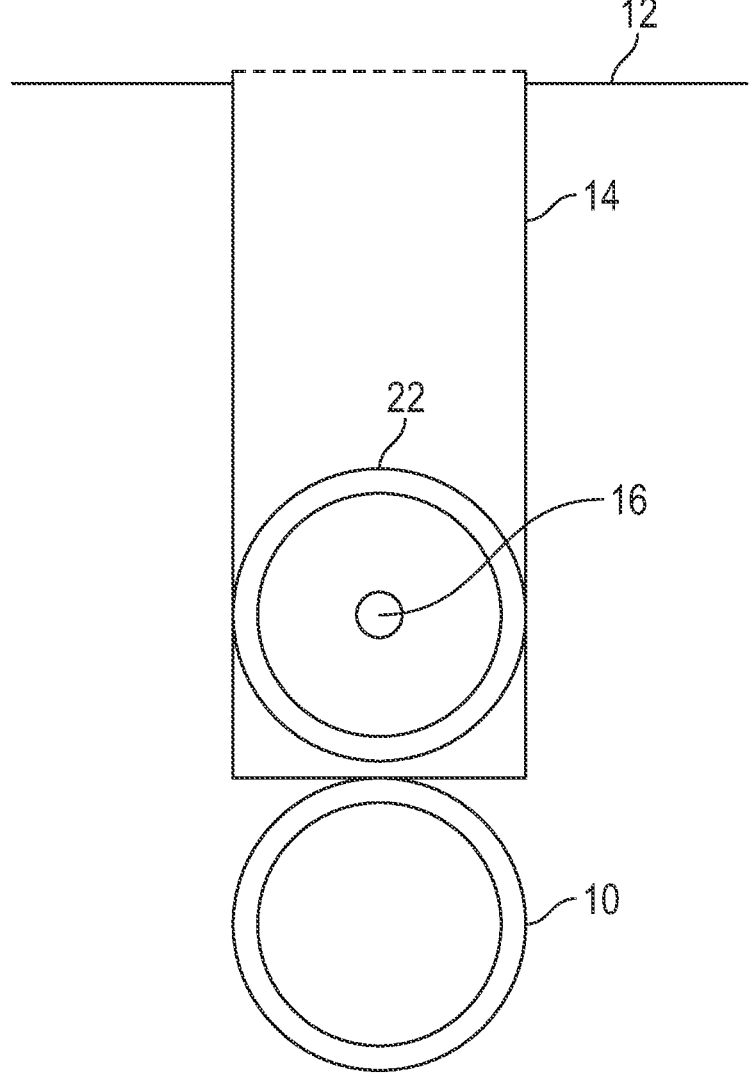
FIG. 5 is a schematic view showing an alternative placement of the new pipe on top of the old pipe, according to the process of the present invention.

The new pipe 22 runs substantially parallel to the old pipe 10, with the old and new pipes being closely spaced to one another. For example, the new pipe 22 may be within inches of the old pipe 10. As seen in FIG. 2, the new pipe 22 may be at the same elevation as the old pipe 10, and laterally offset to one side of the old pipe. Alternatively, as shown in FIG. 1, the new pipe 22 may be laterally offset, and slightly deeper than the old pipe 10. In a further alternative, the new pipe may be laterally offset and slightly higher than the old pipe 10 (not shown). In yet another alternative option, the new pipe may be laid above the old pipe 10, as shown in FIG. 5. Thus, the new pipe may be located substantially anywhere adjacent the old pipe, other than beneath the old pipe.

With the present invention, the old main 10 is not removed or destroyed. The old main 10 can be repurposed for use with new utilities, such as fiber optics or other underground, pipe usage. Alternatively, the ends of the old main 10 can be capped or temporarily plugged, until further use is needed for the old main.

The non-disruptive underground pipe or main replacement process of the present invention also has the benefit of staying within the property casements, or right of way owned by the water company, since the new pipe 22 is placed adjacent, preferably within inches, of the old pipe 10. This new method also reduces the number of employees needed to do the work, which is beneficial when times are difficult for hiring workers and reduces labor costs for the installation job.

The process of the present invention can be utilized for existing or old water mains, as well as for underground pipes conveying other fluids, both liquids or gasses.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A method of installing a new underground pipe adjacent an existing underground pipe, comprising:
   forming a series of substantially vertical bore holes downwardly from ground surface whereby each vertical bore hole visibly exposes the existing underground pipe while maintaining service through the existing pipe;
   directionally boring a hole to pass through each of the boreholes adjacent the existing pipe;
   and pulling a new pipe through the hole while maintaining service through the existing pipe.

2. The method of claim 1 wherein the hole is drilled with a boring stem, and the boring stem is observed through the bore holes.

3. The method of claim 1 wherein water connected to customers via the existing pipe is shut off only after the new pipe is laid.

4. The method of claim 1 wherein the existing pipe is re-purposed for use by other utilities.

5. The method of claim 1 further comprising reaming the hole to a larger diameter ahead of the new pipe.

6. The method of claim 5 further comprising supplying liquid during the reaming to create a slurry which is expelled out of the bore holes.

7. The method of claim 1 wherein the existing and new pipes are at substantially same elevations.

8. The method of claim 1 wherein the new pipe resides within a few inches of the existing pipe.

9. The method of claim 1 further comprising maintaining service to customers connected to the existing pipe until the new pipe is installed.

10. The method of claim 1 wherein the new pipe runs parallel to the existing pipe.

11. The method of claim 1 wherein the new pipe is spaced laterally from the existing pipe.

12. The method of claim 1 wherein the new pipe is spaced above the existing pipe.

13. The method of claim 1 wherein a supply of water to the existing pipe is not shut off until the new pipe is installed.

14. The method of claim 1 wherein the existing pipe remains functional until the new pipe is installed.

15. A replacement process for an existing underground pipe, comprising:
   drilling bore holes downwardly from a ground surface to visibly expose the existing pipe, and without cutting into the existing pipe; then
   boring a pipe hole substantially parallel to the existing pipe and extending through the bore holes; then
   pulling a new pipe through the pipe hole; and
   maintaining service of the existing pipe while the new pipe is pulled into the pipe hole.

16. The process of claim 15 wherein the pipe hole is formed by a pilot stem pulled in a first direction and a reaming head pulled in an opposite second direction.

17. The process of claim 15 wherein the existing pipe is retained for re-purposed use.

18. The process of claim 15 further comprising providing service to the new pipe before service of the existing pipe is discontinued.

* * * * *